(12) United States Patent
Bendre et al.

(10) Patent No.: US 11,163,550 B2
(45) Date of Patent: **\*Nov. 2, 2021**

(54) MULTI-INSTANCE ARCHITECTURE SUPPORTING OUT-OF-BAND DELIVERY OF CONFIGURATION DATA

(71) Applicant: ServiceNow, Inc., Santa Clara, CA (US)

(72) Inventors: Nikhil Prashant Bendre, Carlsbad, CA (US); German Andres Bertot, San Carlos, CA (US); Colby Andrew Blakeman, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,179

(22) Filed: Sep. 4, 2020

(65) Prior Publication Data

US 2020/0403865 A1    Dec. 24, 2020

Related U.S. Application Data

(63) Continuation of application No. 15/972,531, filed on May 7, 2018, now Pat. No. 10,771,327.

(51) Int. Cl.
*G06F 8/65* (2018.01)
*H04L 12/24* (2006.01)
(Continued)

(52) U.S. Cl.
CPC .............. *G06F 8/65* (2013.01); *G06F 9/5072* (2013.01); *G06F 16/27* (2019.01); *H04L 29/08* (2013.01);
(Continued)

(58) Field of Classification Search
CPC ...... G06F 8/65; G06F 9/5072; G06F 11/3442; G06F 11/3495; H04L 67/26; H04L 67/12;
(Continued)

(56) References Cited

U.S. PATENT DOCUMENTS 5,978,594 A    11/1999    Bonnell
6,321,229 B1   11/2001    Goldman
(Continued)

OTHER PUBLICATIONS

M. Watkins, "Inbound integrations performance design on the ServiceNow platform", https://community.servicenow.com/community?id=community_article&sys_id=213ce661dbd0dbc0ldcaf3231f9619be; created in 2016, accessed Mar. 9, 2018).

(Continued)

*Primary Examiner* — Kyung H Shin
(74) *Attorney, Agent, or Firm* — Fletcher Yoder PC

(57) ABSTRACT

An example embodiment may include a central computational instance, as well as a plurality of computational instances that are configured to execute a software module. The central instance may be configured to deliver updates to configuration data for the software module at a plurality of release times. The embodiment may involve a computing device disposed within a particular instance of the plurality of instances transmitting a request for an out-of-band delivery of the configuration data, where the out-of-band delivery is to be made during a time other than any of the release times, receiving the configuration data from source field(s) of a central database of the central instance, and writing the configuration data to destination field(s) of a local database of the particular instance. The embodiment may also involve executing the software module according to the configuration data stored in the destination field(s).

20 Claims, 9 Drawing Sheets

(51) Int. Cl.
*H04L 29/08* (2006.01)
*G06F 16/27* (2019.01)
*G06F 9/50* (2006.01)
*H04L 29/06* (2006.01)
*G06F 21/10* (2013.01)
*H04L 12/66* (2006.01)

(52) U.S. Cl.
CPC .......... *H04L 41/0813* (2013.01); *H04L 41/12* (2013.01); *H04L 63/08* (2013.01); *H04L 67/26* (2013.01); *H04L 67/32* (2013.01); *G06F 21/105* (2013.01); *H04L 12/66* (2013.01); *H04L 63/104* (2013.01); *H04L 63/20* (2013.01); *H04L 67/12* (2013.01)

(58) Field of Classification Search
CPC ......... H04L 12/66; H04L 63/20; H04L 63/08; H04L 63/104; H04L 29/08; H04L 67/1002
See application file for complete search history.

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,634,583 B2 | 12/2009 | Sagar et al. |
| 7,685,167 B2 | 3/2010 | Mueller |
| 7,877,783 B1 | 1/2011 | Cline |
| 7,933,927 B2 | 4/2011 | Dee |
| 7,941,506 B2 | 5/2011 | Bonal |
| 7,945,860 B2 | 5/2011 | Vabenepe |
| 8,082,222 B2 | 12/2011 | Rangarajan |
| 8,346,752 B2 | 1/2013 | Sirota |
| 8,380,645 B2 | 2/2013 | Kowalski |
| 8,554,750 B2 | 10/2013 | Rangaranjan |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,907,988 B2 | 12/2014 | Poston |
| 9,015,188 B2 | 4/2015 | Behne |
| 9,037,536 B2 | 5/2015 | Vos |
| 9,137,115 B2 | 9/2015 | Mayfield |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,659,051 B2 | 4/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2009/0228577 A1 | 9/2009 | Webb-Johnson |
| 2011/0295999 A1 | 12/2011 | Ferris |
| 2014/0282915 A1 | 9/2014 | Tekwani |
| 2017/0329808 A1 | 11/2017 | Lachman |

OTHER PUBLICATIONS

Distributing software, Documentation for BMC Client Management 12.5, BMC Documentation.
Software distribution overview, Documentation for BMC Client Management 12.5 , BMC Documentation.
ServiceNow Product Documentation, "Team Development"; Jun. 15, 2017; https://docs.servicenow.com/bundle/iakarta-application-development/page/build/team-development/concept/c_TeamDevelopment.html.

MULTI-INSTANCE ARCHITECTURE SUPPORTING OUT-OF-BAND DELIVERY OF CONFIGURATION DATA

CROSS REFERENCE TO RELATED APPLICATION

The present application claims priority to U.S. patent application Ser. No. 15/972,531, filed on May 7, 2018, the contents of which are entirely incorporated herein by reference, as if fully set forth in this application.

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises or other entities (as well as both internal and external users thereof) may access through computational instances of the remote network management platform.

SUMMARY

The software applications through which the remote network management platform provides services may be higher-level applications, or "software modules," deployed within or involving a computational instance of the remote network management platform. Each such software module may have associated configuration data that defines how the software module operates, is accessed, is designed, and/or provides a particular service. For example, configuration data for a software module that provides a software asset management service may include hardware attributes, software attributes, license information, or other information that facilitates discovery, software entitlement, and/or other operations relating to software asset management performed by the enterprise. As another example, configuration data for a software module that provides a security operations management service may include virus information, security policies, and/or other parameters related to detecting, identifying, and handling security threats. Other, more general, types of configuration data are possible as well, which could facilitate provision of one or more such services.

Every so often, the remote network management platform may update the software module, and thereby update the configuration data associated with the software module, through delivery of new software releases for the software module and/or patches to new or previous software releases. Typically, the remote network management platform may deliver these updates at particular release times.

However, the remote network management platform may update the configuration data associated with the software module more frequently than updates to the software module are delivered. For example, the remote network management platform may add, delete, or modify the configuration data for the software module during development of a release or patch for the software module, but may not deliver such a release or patch until the release or patch is finalized and tested. As such, existing software-module-update delivery schemes may present a delay between when configuration data is updated and when users have access to that latest update to the configuration data. Users may be required to wait until one of the plurality of release times in order to update the software module with the latest configuration data. This may present various issues, particularly for enterprises and users whose operations may be helped or improved by access to the latest configuration data, but whom are unable to access such configuration data as-needed.

Therefore, in accordance with the present disclosure, the remote network management platform may be configured to support "out-of-band" delivery of configuration data to enterprise-dedicated computational instances—namely, delivery of configuration data that is made during a time other than any of the particular release times noted above. To facilitate this, a central computational instance of the remote network management platform may be dedicated for storing configuration data for a software module and may be configured to serve requests for out-of-band delivery of the configuration data. As such, an enterprise-dedicated computational instance that is configured to execute the software module may transmit a request for out-of-band delivery of the configuration data, receive the latest configuration data from the central computational instance, and then write that configuration data to a local database. The enterprise-dedicated computational instance may then execute the software module with the latest configuration data.

Accordingly, a first example embodiment may involve determining, by a computing device disposed within a particular computational instance of a remote network management platform, one or more source fields of a source table within a central database of a central computational instance of the remote network management platform, the one or more source fields containing configuration data for a software module. The software module, when executed, may enable access to a software management service provided by the remote network management platform. The central computational instance may be configured to deliver updates to the software module, including updates to the configuration data, at a plurality of release times. The particular computational instance may be one of a plurality of computational instances of the remote network management platform that are associated with respective managed networks and configured to execute the software module. A local database may be disposed within the particular computational instance.

The first example embodiment may also involve transmitting, by the computing device, a request for an out-of-band delivery of the configuration data contained in the one or more source fields. The out-of-band delivery may be made during a time other than any of the plurality of release times.

The first example embodiment may also involve determining, by the computing device, one or more destination fields of a destination table within the local database of the particular computational instance.

The first example embodiment may also involve receiving, by the computing device, the configuration data from the one or more source fields and writing the configuration data to the one or more destination fields.

The first example embodiment may also involve executing, by the computing device, the software module in accordance with the configuration data stored in the one or more destination fields.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
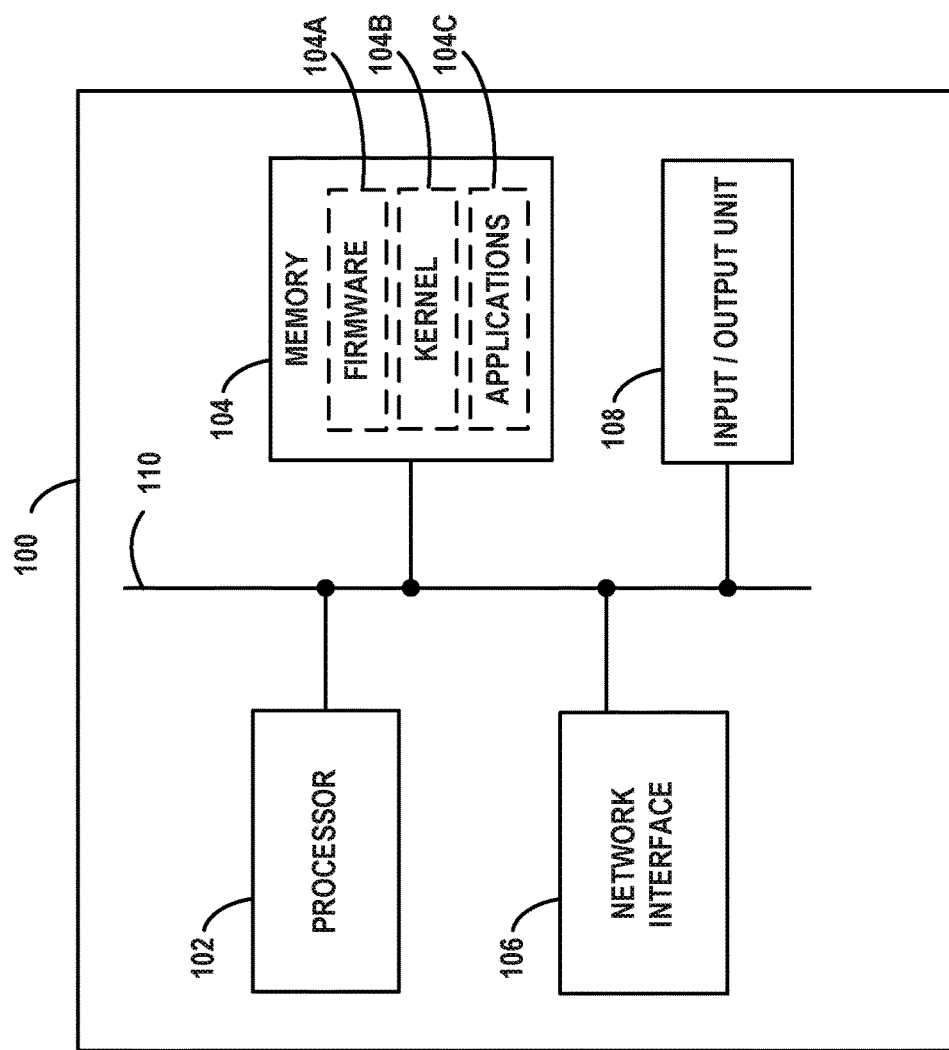
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
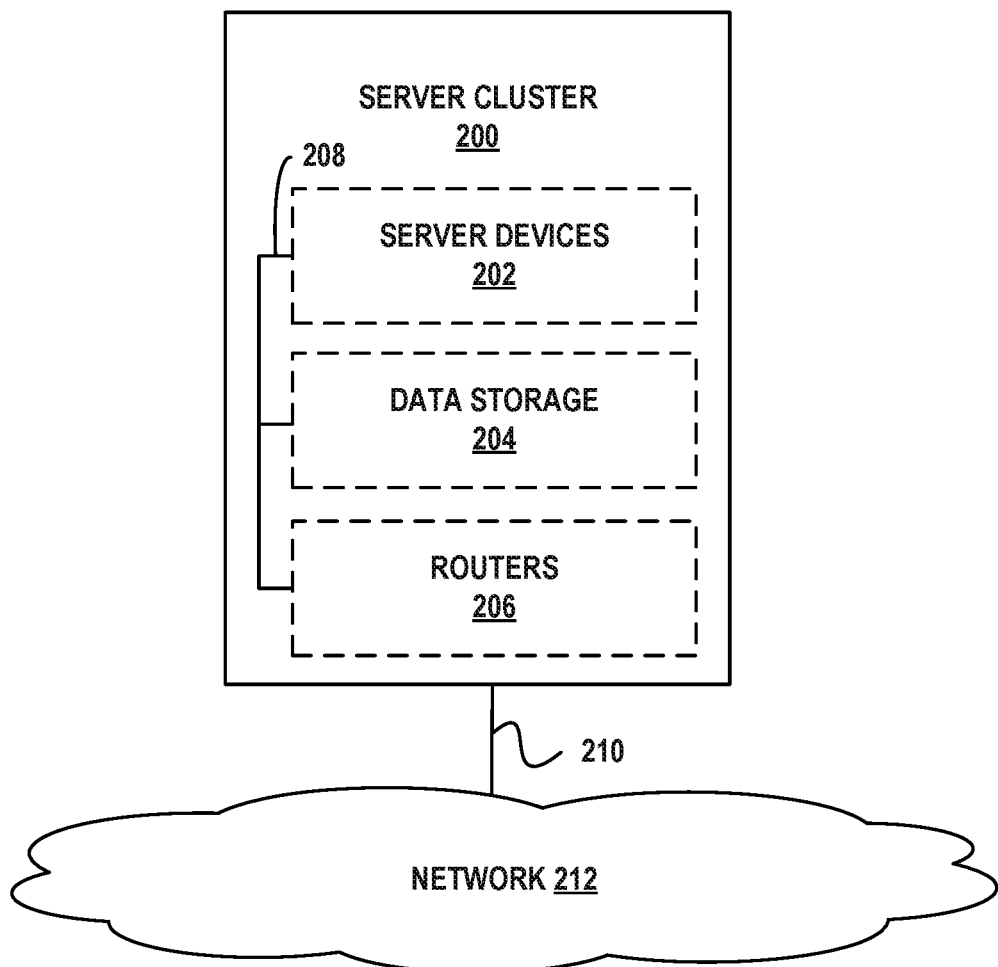
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
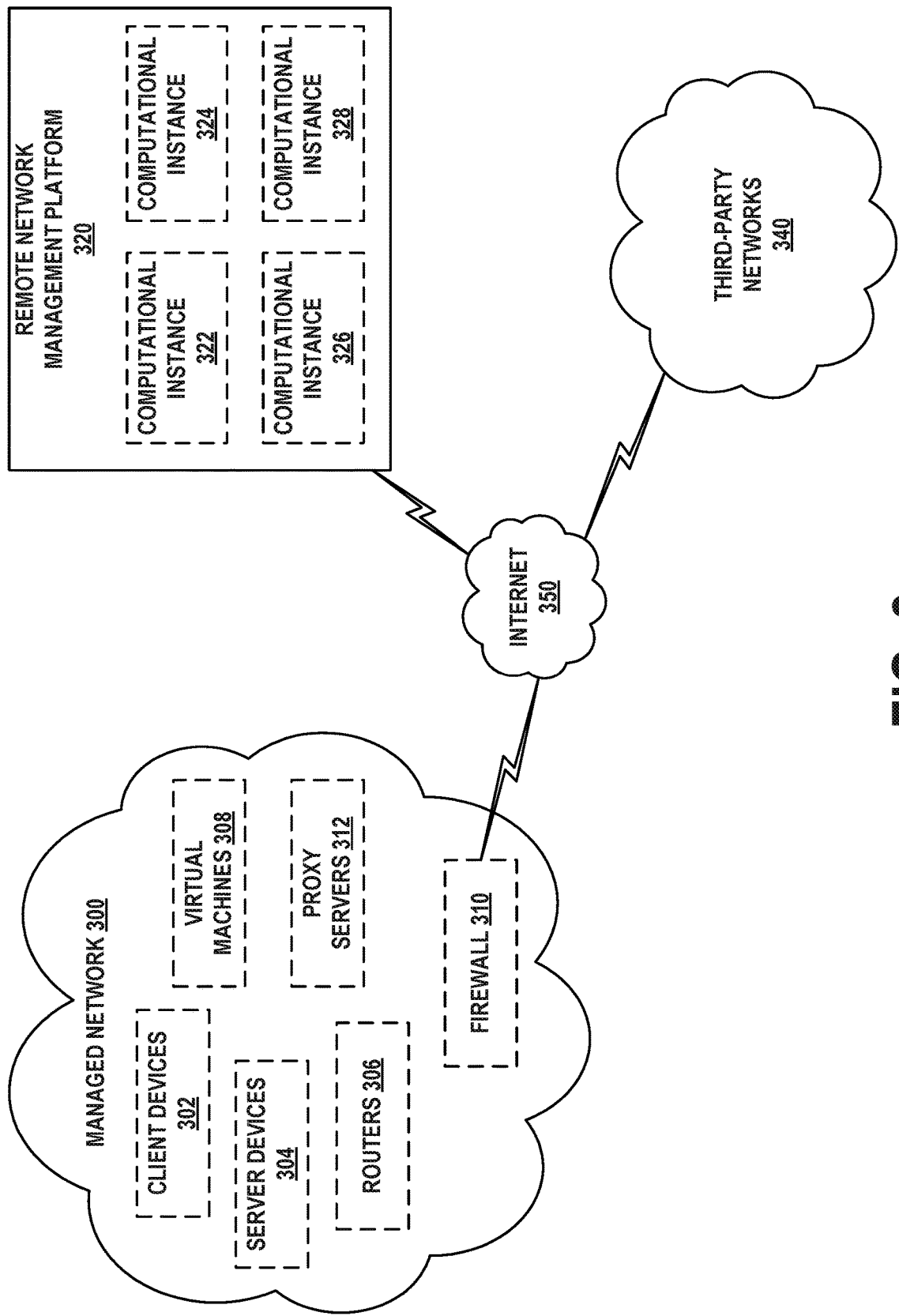
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
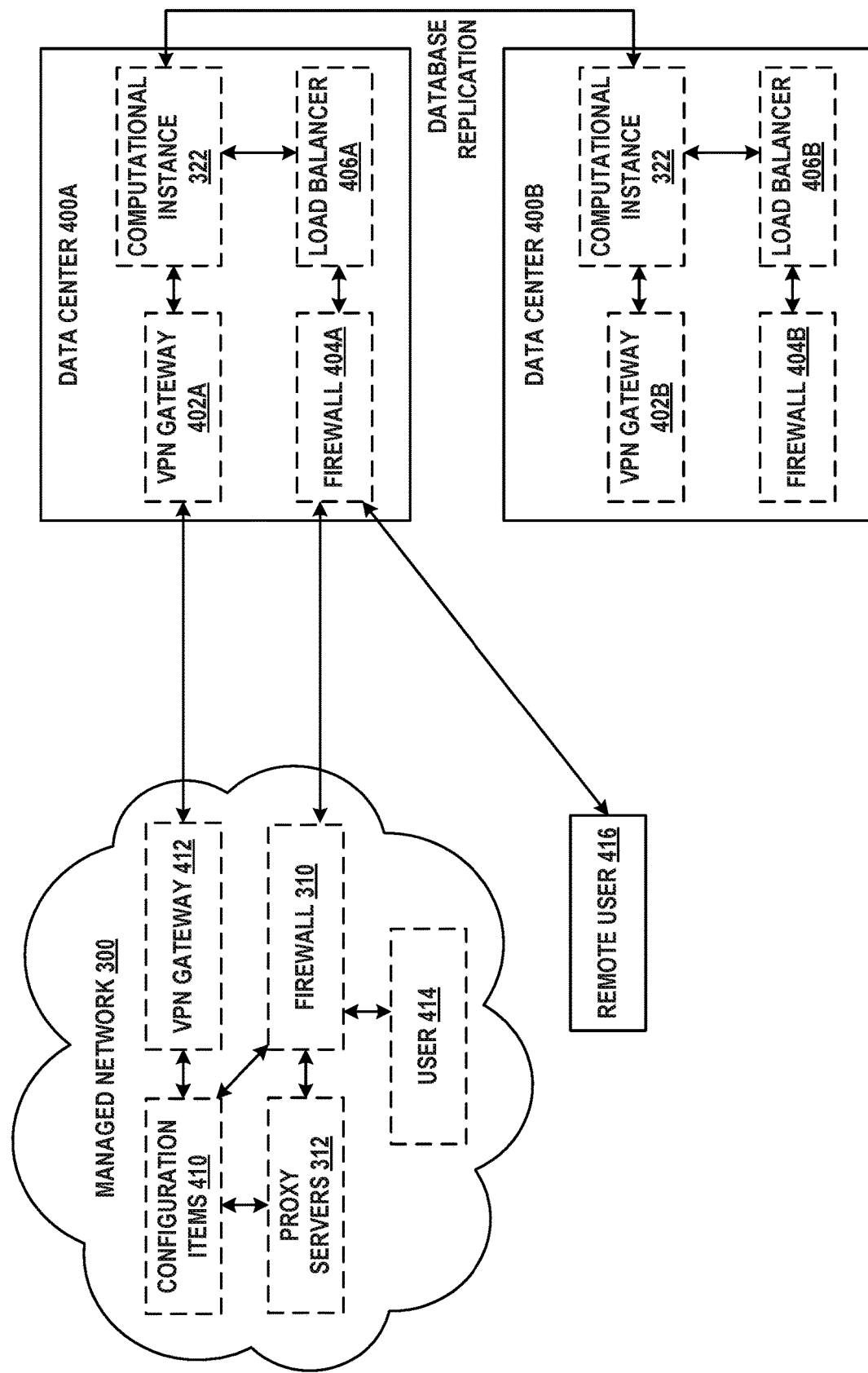
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
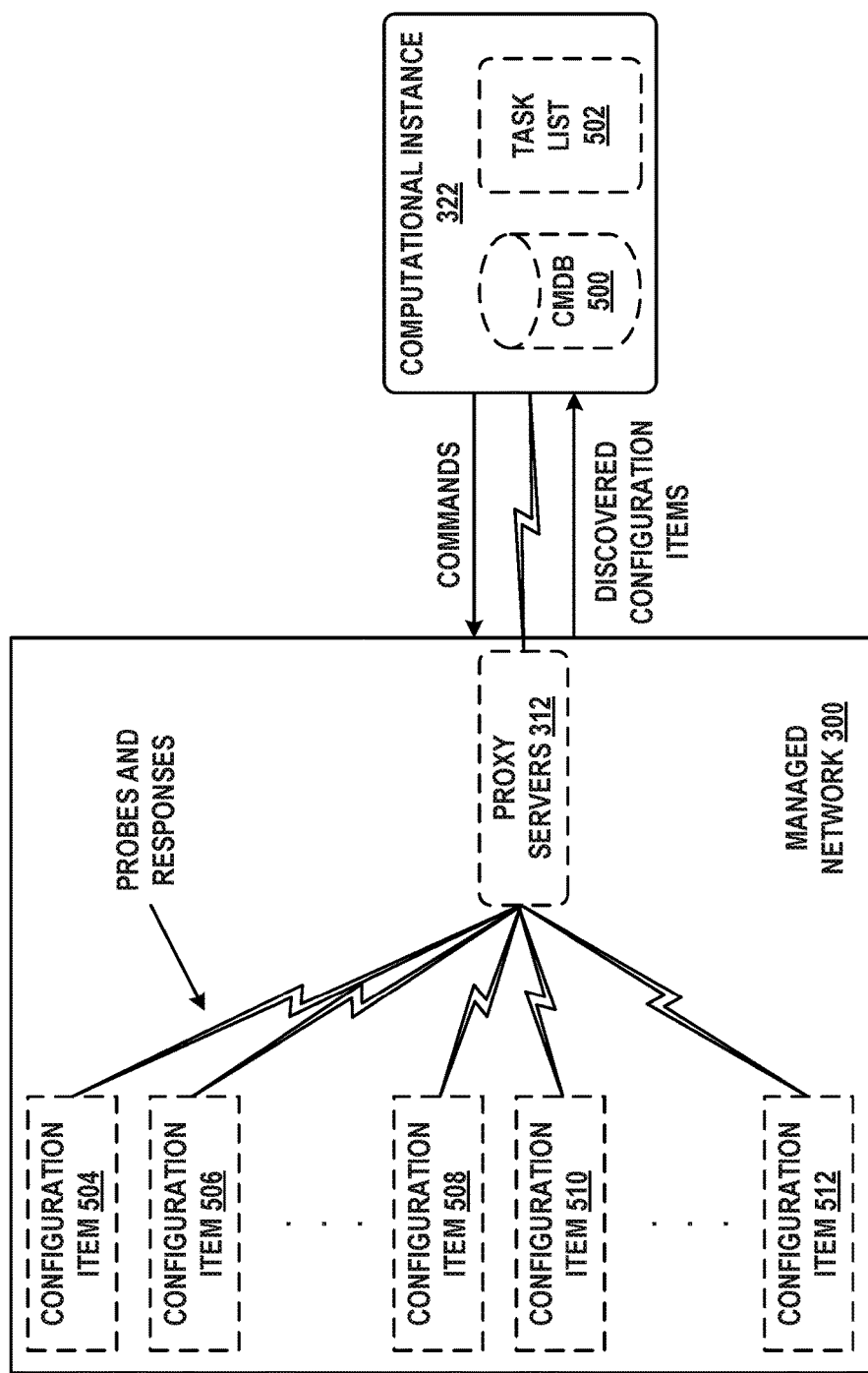
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
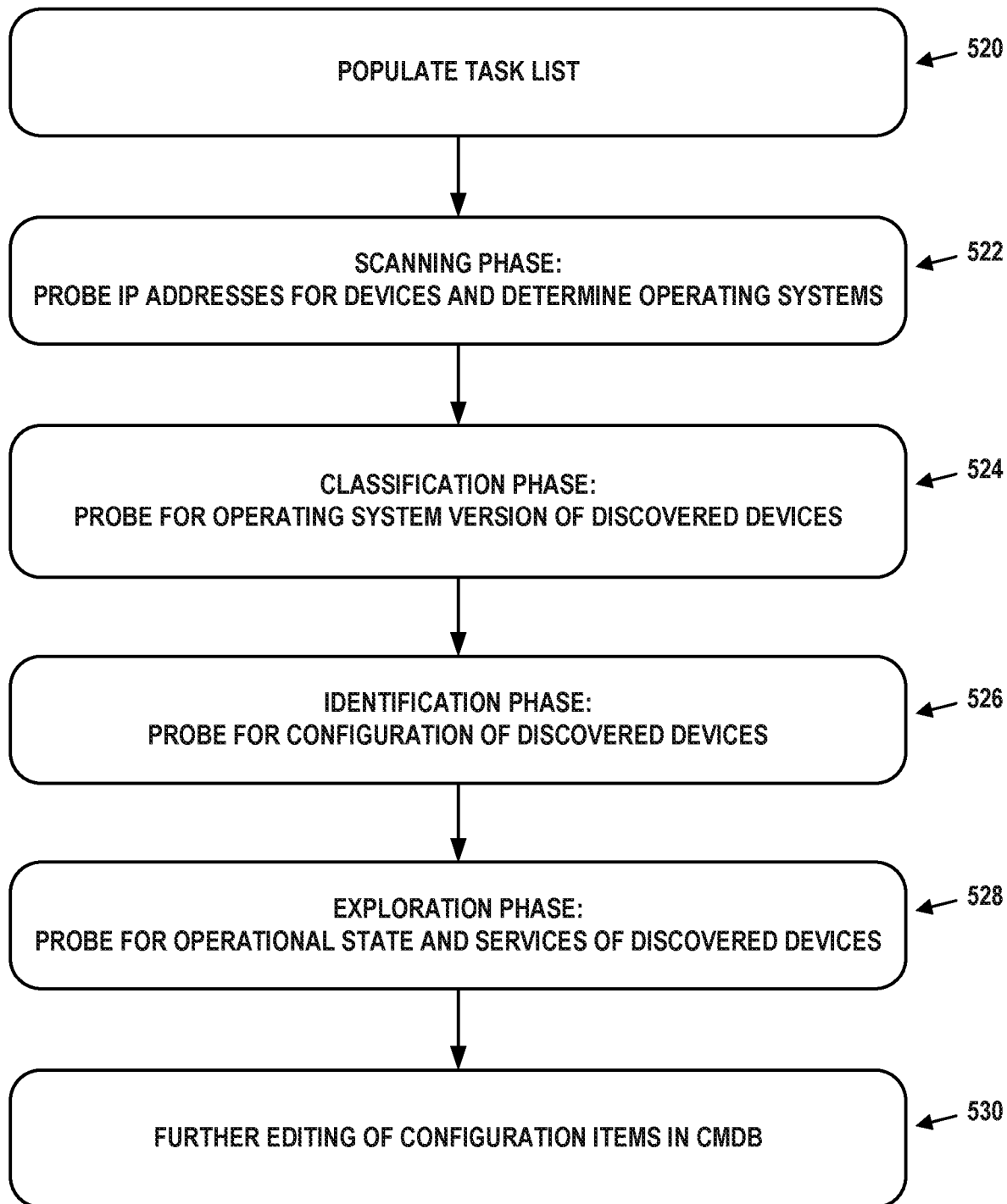
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Normalization of Configuration Items Using Canonical Information

During each phase of discovery, various modules of computational instance 322 may process the responses to the probes sent from proxy servers 312. Such processing may assist in identifying various characteristics of the devices, applications, services, and relationships represented by the responses. After processing the responses, the modules may update configuration items stored in the CMDB 500 such that these configuration items more accurately represent a device, application, service, or relationship that is present in the managed network. Such processing and updating of configuration items may be referred to as normalization.

As an example of this processing, computational instance 322 may compare information received from proxy servers 312 to data stored in a normalization database to determine whether a configuration item is correctly identified. This data could be referred to herein as canonical normalization information, and may correspond to attributes associated with known configuration items such as devices, services, or relationships that may exist within a managed network. For example, a computing device may be represented by attributes that include a model, type, and operating system of the computing device. As another example, a software application installed on a computing device may be represented by attributes that include a name, publisher, edition, version, operating system, and/or a product description of the software application.

To help ensure that configuration items are consistently identified correctly, the process of normalization may involve updating identifying information stored in the normalization database for a particular configuration item with canonical normalization information that corresponds to attributes of that configuration item.

Considering a particular software application that is installed on a client device of managed network 300, for example, canonical normalization information may include information that corresponds to attributes of that software application. To that end, identifying information stored in the database for software application "A" may specify that publisher "X" is the publisher for software application A. But canonical normalization information stored in the content library may specify that publisher "Y" is the publisher for the software application A. As a result, based on this canonical normalization information, the system may update the identifying information stored in the database to instead specify that publisher Y is the publisher for software application A.

In some situations, however, the normalization database may initially not include canonical normalization information for a particular software application, and thus normalization information for this software application may be manually entered, such as following a prompt displayed on a graphical user interface (GUI) of a client device. After establishing normalization information for the particular software application by way of such manual entry, the normalization database may eventually be updated to include canonical normalization information for the particular software application.

Though each attribute of the software application may ultimately be normalized in some scenarios, some of the attributes may remain unidentified in other scenarios.

VII. Example Determination of Software License Information

Generally, normalization may be useful to an enterprise for various reasons. For example, each client device of an enterprise may be tasked with performing a set of operations, and accordingly may use a combination of software applications to perform those tasks. While some such software applications may be hosted by an aPaaS system, as described above in relation to FIGS. 1 through 4, others may be installed on the individual computing, client, and/or server devices themselves. Such software is often proprietary, and may be licensed in various ways.

Regardless of the licensing scheme, the enterprise may attempt to keep track of which of its computing, client, and/or server devices use what licensed software. To facilitate this, the enterprise may attempt to maintain accurate software entitlement records, which provide information about software license rights held by the enterprise's managed network. Such license information may include information specific to various software applications. As an example, for a given software application, license information may include a publisher/vendor name for the software application, a publisher part number, a software model (e.g., a name, version, and/or edition of the software application), a license metric of the software application (e.g., whether the software application is licensed per computing device, per processor, per processor core, per user, etc.), and/or a license duration of the software application. Additionally or alternatively, such license information may include information that represents collective software usage for the managed network, including but not limited to purchased rights (e.g., number of licenses purchased/held by the managed network) and/or license metrics for the managed network, among others.

In any case, by maintaining accurate information in its software entitlement records—as well as by maintaining accurate identifying information about its software applications, as discussed above—the enterprise can even better track to what degree software usage complies with software license rights held by the managed network.

Still, tracking software application usage across an entire enterprise may present challenges. A large enterprise may use thousands of separate computing devices, each of which may use a set of software applications. Further, such computing devices may go in and out of service, or require different software applications over time. Still further, different versions or builds of each software application may be installed across these computing devices.

Tracking the use of software within an enterprise may be achieved using an aPaaS system as described above in relation to FIGS. 1 through 5B. Such an aPaaS system may be particularly suited to tracking such software usage because the aPaaS system may gather information from computing devices in managed networks such as the enterprise. Other techniques for tracking the use of software within an enterprise are possible as well.

As will be discussed in more detail below, the embodiments described herein provide a technical improvement over previous approaches for software asset management, including but not limited to improvements to maintaining accurate, consistent, and up-to-date identifying information for software applications and maintaining accurate, consistent, and up-to-date software entitlement records.

VIII. Example Out-of-Band Delivery of Configuration Data

As noted above, the remote network management platform 320 may provide various services accessible to users of managed networks (e.g., enterprises and employees thereof) via computational instances (e.g., computational instance 322). In particular, these services may be provided through higher-level applications—also referred to herein as "software modules"—deployed within or involving a computational instance, such as computational instance 322. For the purposes of example, embodiments described herein involve a one-to-one mapping of a software module to a service. That is, any one software module may be designated for, and thus enable access to, one particular service. However, it should be understood that, in some scenarios, one software module may be configured to enable access to multiple different services.

An example of such a service may be a software asset management service, which enables an enterprise to determine which hardware and software components are being used to support certain enterprise operations. Another example service may be a security operations management service, which enables an enterprise to implement security procedures for avoiding potential security risks, as well as for detecting, identifying, and possibly remedying security threats. Other example services are possible as well, such as policy and compliance management, risk management, audit management, and vendor risk management.

To enable a software module to provide a particular service for which the software module is designated, the software module may have associated configuration data. This "configuration data" may refer to any data (e.g., source code, executable code, data on which code operates, scripts, and/or environment variables) that defines how the software module operates, is accessed, is designed, and/or provides the particular service. As an example, configuration data for a software asset management software module may include hardware attributes, software attributes, canonical normalization information, license information, or other information that facilitates discovery, software entitlement, and/or other operations performed by the enterprise.

As another example, configuration data for a security operations management software module may include observable indicators of particular security threats (e.g., names of security threats, or IP addresses, URLs, email addresses, etc. that are known or suspected to be associated with security threats), security policies (e.g., workflows for mitigating and/or preventing certain types of security threats), and/or other parameters related to detecting, identifying, and handling security threats.

As yet another example, configuration data could additionally or alternatively include more general configuration data, such as bug fixes for the software modules. Other configuration data examples can include one or more of the following: record-based rules (e.g., rules defining actions that can be performed with respect to a record stored in a database), client scripts (e.g., client-side JavaScript that runs in a web browser), script includes (e.g., server-side scripts that define a function or class), UI policies (e.g., code or scripts that define how the behavior of information on a form can change and/or that define process flows for completing tasks), and UI macros (e.g., discrete, custom scripted controls or interfaces that can be added to a UI). Other examples of configuration data are possible as well.

Management of the configuration data may occur at a central computational instance—also referred to herein as a central data source (CDS) instance—that is associated with a central network. The central network may be a different, separate network from any managed network (e.g., managed network 300) that is associated with an enterprise or other customer. For example, the central network may be managed by an entity associated with the remote network management platform 320. Still, the CDS instance can be configured similarly to any of the other computational instances described herein. For example, the CDS instance may have a dedicated central database on one or more server devices, and may store the configuration data (as well as updates thereto) in the central database. Other information may be stored at the central database as well. Further, in some embodiments, management of the configuration data can occur at other computational instances, such as any computational instance developed by the entity associated with the remote network management platform 320.

From time to time, the remote network management platform 320 may update the software module, thereby updating the configuration data associated with the software module. These updates may be delivered by the remote network management platform 320 (e.g., by the CDS instance) in the form of new software releases for the software module and/or patches to new or previous software releases.

Typically, the remote network management platform 320 may deliver these updates at a plurality of release times. One or more of the plurality of release times may be predetermined (e.g., scheduled). For example, updates to the software module may occur at a predetermined frequency over a predetermined period of time, such as (i) monthly patches for at least one year, (ii) quarterly patches for at least one year, (iv) monthly patches until a new version of the software is released, and/or (v) monthly patches for six months and quarterly patches thereafter, among other possibilities. Additionally or alternatively, one or more of the plurality of release times may be dynamically determined, and might not be known by the enterprise (or perhaps even an entity associated with the remote network management platform) in advance. For example, in some scenarios, the remote network management platform 320 may require a user to manually navigate to a designated web page and submit a request (e.g., an incident ticket) to schedule an upgrade. In response to the request, the remote network management platform 320 may responsively grant the request and schedule the upgrade at a time dictated by an entity associated with the remote network management platform 320 or a time agreed upon by the user and the entity.

For the purposes of example, a delivery of updates to the software module (and configuration data associated therewith) that typically occurs at the plurality of release times discussed above may be referred to herein as "in-band" delivery.

However, the remote network management platform 320 may update the configuration data associated with the software module more frequently than in-band deliveries of updates to the software module occur. For example, in-band delivery of releases or patches for the software module may occur monthly, yet the remote network management platform 320 may update or otherwise change the configuration data on a daily or weekly basis, or perhaps at some other times.

As such, existing implementations of in-band delivery of updates to software modules may present a delay between when configuration data is updated and when users have access to that latest update. There may be various reasons for this delay. For example, the remote network management platform may test a release or patch before authorizing in-band delivery of the release or patch. As another example, if a user submits a request to schedule an upgrade, the user may have to wait days or weeks until the remote network management platform processes the request, approves the request, and perhaps performs additional actions related to the request (e.g., assigning the request to an agent). Other factors may contribute to the delay as well.

In any event, users may be required to wait long periods of time (e.g., months or longer) until an in-band delivery in order to update the software module with the latest configuration data. This may be particularly problematic for users whose operations may be helped or improved by access to the latest configuration data, but whom are unable to access such configuration data as-needed.

For at least these reasons, improved scalability to the process of delivering updates to configuration data is desired, as well as increased efficiency in accessing configuration data on an as-needed basis.

Accordingly, the present disclosure provides an improved remote network management platform that supports out-of-band delivery of configuration data—namely, delivery of configuration data that is made during a time other than any of the plurality of release times described above. In particular, a CDS instance of a remote network management platform may be configured with program logic to accept and process requests from other computational instances (e.g., enterprise computational instances associated with respective managed networks) for out-of-band delivery of the configuration data. These other computational instances—hereafter referred to as "enterprise computational instances" or, by way of example, computational instance 322—may be configured to execute the software module with which the configuration data is associated. Upon acceptance and processing of the requests for out-of-band delivery, the CDS instance may enable the enterprise computational instance to receive the latest configuration data from the CDS instance's central database. The enterprise computational instance may then write that configuration data to a local database disposed within the enterprise's computational instance. Thereafter, the enterprise computational instance may execute the software module with the configuration data.

The present disclosure therefore improves computer functionality in that enterprise computational instances can access the latest configuration data and execute a software module according to that configuration data, thereby enabling the enterprise computational instances to take advantage of the latest improvements and other changes made to the configuration data with minimal to no delay. The ability to run the latest software and have as-needed access to the latest configuration data may in turn enable enterprises to better utilize the remote network management platform's services. For example, access to the latest canonical normalization information may improve discovery results for an enterprise, and/or access to the latest security policies may reduce the exposure and impact of security threats on client devices in the enterprise's managed network.

Furthermore, at least part of the disclosed process can be automated, thereby even further reducing delay, and additionally reducing or eliminating efforts taken by the remote network management platform to schedule in-band, or even out-of-band, deliveries of updates to configuration data. Moreover, it should be understood that configuration data that is delivered out-of-band might not be exclusive to out-of-band deliveries. For example, configuration data that is delivered out-of-band could be delivered in-band, and vice versa.

These and other improvements are described in more detail below, though it should be understood that the operations described below are for purposes of example. Systems relating to out-of-band delivery of configuration data may provide other improvements as well.

Figure 6:
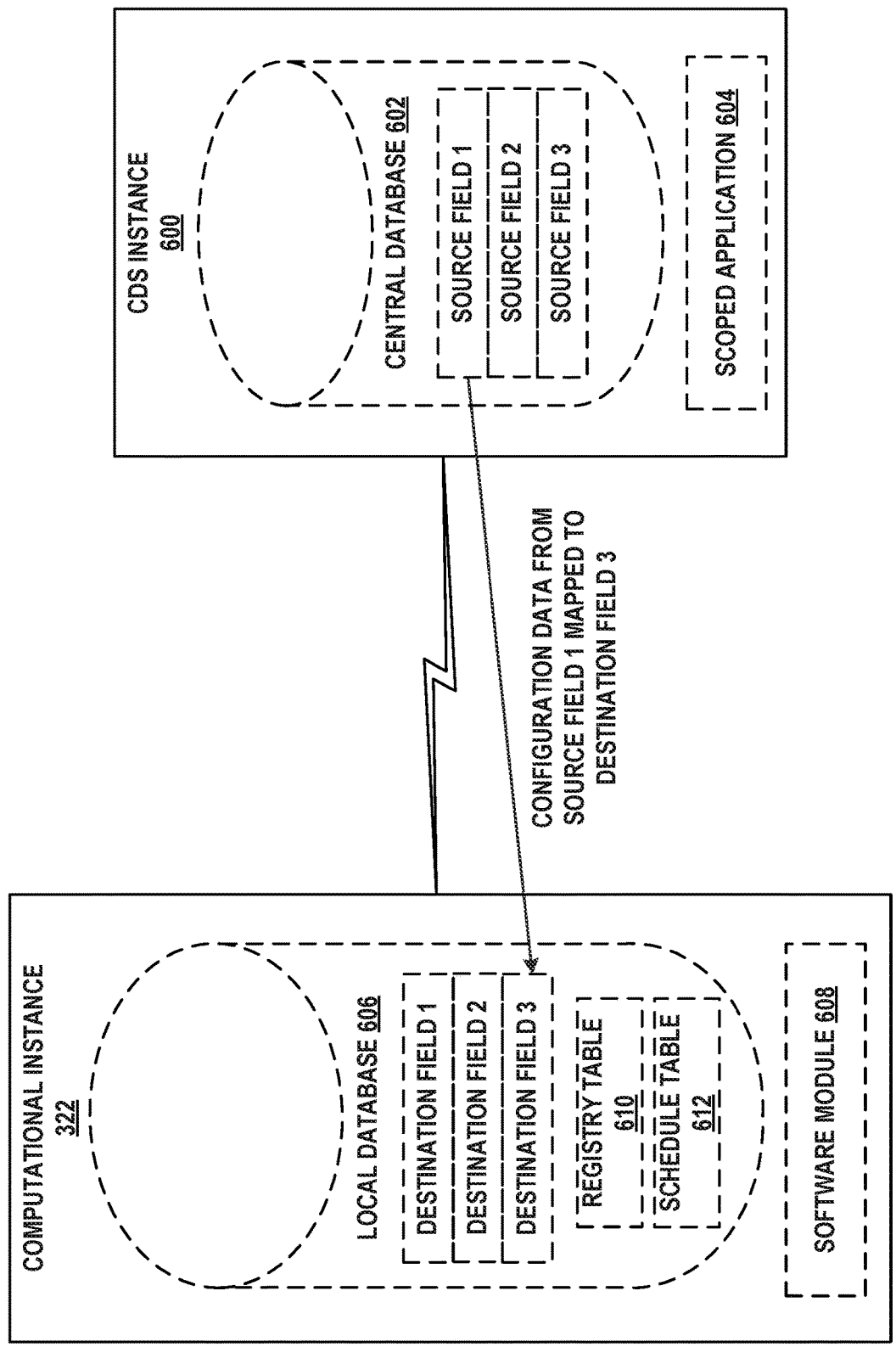
FIG. 6 depicts another communication environment involving a remote network management architecture, in accordance with example embodiments.

An example of out-of-band delivery of configuration data will now be described with respect to FIG. 6. FIG. 6 depicts yet another communication environment involving a remote network management architecture, in accordance with example embodiments. As shown, CDS instance 600 includes central database 602. In some embodiments, central database 602 may be located on one or more server devices (not shown). Further, central database 602 includes a source table with three source fields (Source Field 1, Source Field 2, and Source Field 3). Each of these source fields may correspond to at least a portion of the configuration data for a particular software module.

In other embodiments, central database 602 may include additional tables and/or more or less source fields. In many of such embodiments, central database 602 may include many more source fields than those shown in FIG. 6, such as hundreds of source fields. Further, in embodiments where central database 602 includes multiple source tables, some source fields may be present in more than one of such source tables. For example, central database 602 could include three source tables, and Source Field 1 may be present in each of the three source tables. Other examples are possible as well.

In some embodiments, CDS instance 600 may include a scoped application, such as scoped application 604. Such a scoped application may be an application customized by an entity associated with the remote network management platform 320. Further, scoped application 604 may be configured to run on CDS instance 600 and may be programmed with logic to receive and process requests for out-of-band delivery of the configuration data. In addition, scoped application 604 may have associated access rules, perhaps in the form of an access control list (ACL), that define which users (e.g., users with an administrator role) and/or other applications are allowed to access scoped application 604 and its data.

In other embodiments, other applications or computing devices could be installed or otherwise disposed on CDS instance 600 and could perform some or all of the operations related to receiving and processing requests for out-of-band delivery.

As further shown in FIG. 6, CDS instance 600 is in communication with a representative enterprise computational instance—namely, computational instance 322. Computational instance 322 includes local database 606 and software module 608. In the example shown in FIG. 6, the configuration data stored in the source table at CDS instance 600 includes configuration data for software module 608. Further, local database 606 includes a destination table with three destination fields (Destination Field 1, Destination Field 2, and Destination Field 3).

In other embodiments, local database 606 may include additional tables and/or more or less destination fields. In many of such embodiments, local database 606 may include many more destination fields than those shown in FIG. 6, such as hundreds of destination fields. Further, in embodiments where local database 606 includes multiple destination tables, some destination fields may be present in more than one of such destination tables. For example, local database 606 could include three destination tables, and Destination Field 1 may be present in each of the three destination tables. Other examples are possible as well.

In some embodiments, computational instance 322 (or any computational instance that can request out-of-band delivery of configuration data, for that matter) may include a registry table. For example, local database 606 is shown to include registry table 610. Such a registry table may contain information identifying one or more source fields of the source table in central database 602 and may define a mapping between the one or more source fields and corresponding destination fields of the destination table in local database 606. Computational instance 322 can thus refer to the registry table in order to determine which source fields correspond to which destination fields, as well as what kind of configuration data is associated with each such field. For example, suppose that Destination Field 3 is mapped to Source Field 1 and computational instance 322 requests out-of-band delivery of configuration data from Source Field 1. Upon receipt of the configuration data, computational instance 322 can refer to the mapping defined by registry table 610 to determine that the configuration data is to be stored at Destination Field 3. Further, such a mapping may be particularly useful in scenarios where column names in the source table are different from those in the destination table.

In any event, when changes are made to the source table, such as an addition of a new column to the source table, the registry table may need to be updated to include a mapping of the destination table to the changed source table (e.g., to the newly added column). Likewise, when a source table is added to the central database, the registry table may be updated to include a mapping of the destination table to the newly added source table. Further, fields in one source table can be split across multiple destination tables, or vice versa.

In some embodiments, the registry table may include or otherwise serve as the destination table, and thus requested configuration data may be stored in the registry table. Alternatively, in other embodiments, the registry table and the destination table may be separate tables.

In some embodiments, computational instance 322 (or any computational instance that can request out-of-band delivery of the configuration data, for that matter) may include a schedule table. For example, local database 606 is shown to include schedule table 612. Such a schedule table may contain information defining when computational instance 322 will request out-of-band delivery of the configuration data. Computational instance 322 can thus refer to the schedule table in order to determine a time or frequency at which to request out-of-band delivery of the configuration data, and then transmit such a request at that time or frequency. For example, the schedule table may contain information specifying that the computational instance 322 is to request out-of-band delivery of the configuration data on a daily basis (e.g., at the same specified time each day).

Additionally or alternatively, the schedule table may contain information specifying other times or frequencies at which to request out-of-band delivery of the configuration data. Such times or frequencies could be predetermined or randomized. For example, out-of-band deliveries of configuration information may be configured to be regulated weekly, such as on Sunday at 1:00 am of the time zone in which computational instance 322 resides or of the time zone of the entity computational instance 322 serves. In other embodiments, computational instance 322 (e.g., one or more computing devices disposed thereon) may be configured to determine when to request out-of-band delivery of the configuration data in another manner, other than using a schedule table.

In some embodiments, the registry table and/or the schedule table may be accessible to and/or managed by only authorized parties, such as a user associated with the enterprise (e.g., an administrator employed by the enterprise), an application developer certified by the entity associated with the remote network management platform 320, and/or other parties. Each such party may have various degrees of authorization, including but not limited to the authority to view the registry table and/or the schedule table, populate the registry table and/or the schedule table with information, and/or update the registry table when changes are made to the source table or when a new source table is added, among other possibilities.

With the architecture shown in FIG. 6, when an enterprise seeks to initiate an out-of-band delivery of the configuration data, computational instance 322 may determine one or more source fields of the source table, where the source field(s) contain the configuration data for which the enterprise will request out-of-band delivery. This act of determining one or more source fields may involve computational instance 322 receiving, from the enterprise, user input representing a selection of configuration data for which computational instance 322 will request out-of-band delivery. Because the selected configuration data corresponds to one or more of the source fields present in the source table of central database 602 and identified by registry table 610, selecting the configuration data acts as a determination of one or more source fields.

As an example, the enterprise may access a web-portal or software application through which the remote network management platform 320 provides a GUI that includes a catalog of types of configuration data and enables the enterprise to select the configuration data. If software module 608 is a software asset management software module, for instance, the enterprise may select the entirety of software asset management configuration data stored at central database 602. Alternatively, the enterprise could select a subset of the software asset management configuration data stored at central database 602, such as a subset of the configuration data that is updated more frequently than other software asset management configuration data outside of the subset. The enterprise may select other portions or entireties of configuration data related to other software modules as well.

Further, as a more particular example, the remote network management platform 320 may enable the enterprise to subscribe to out-of-band delivery of certain types of configuration data. For example, if software module 608 is a software asset management software module, the enterprise may subscribe to out-of-band delivery of at least a portion of software asset management configuration data stored at central database 602. Once subscribed, the remote network management platform 320 may enable such configuration data to be delivered out-of-band to computational instance 322.

In some embodiments, when any amount of the configuration data for software module 608 is selected (e.g., subscribed to)—be it a subset of the configuration data for software module 608 or the entirety of the configuration data for software module 608—this may cause schedule table 612 to be populated with a time, time period, frequency, etc. according to which computational instance 322 will transmit requests for the out-of-band-delivery.

After selecting the configuration data to be delivered out-of-band, computational instance 322 may transmit a request for an out-of-band delivery of the configuration data. The act of transmitting the request may take various forms. For example, computational instance 322 may transmit a single request message or series of request messages to CDS instance 600 (e.g., to a computing device of CDS instance 600 running scoped application 604). In scenarios where only a single request message is transmitted, the request message may include identifier of all the source fields having the selected configuration data. On the other hand, in scenarios where a series of request messages are transmitted, each such request message may include identifiers of the source fields having the selected configuration data. In some embodiments, the request message(s) may take the form of a representational state transfer (REST) API call or series of REST API calls.

Referring to FIG. 6, to receive an out-of-band delivery of configuration data, computational instance 322 may transmit a request message including an identifier of Source Field 1.

In scenarios where schedule table 612 defines a time at which computational instance 322 is to transmit the request, the act of transmitting the request may involve doing so (e.g., transmit a request message, or begin transmitting a series of request messages) at that time. Further, in scenarios where schedule table 612 defines a frequency at which to transmit requests for out-of-band delivery of the configuration data, the act of transmitting the request may involve transmitting requests for the out-of-band delivery of the configuration data to occur at that frequency (e.g., transmit a request every day at 1:00 am).

In any event, upon receipt of a request message or messages, CDS instance 600 may in turn transmit another request message or series of request to a server device or other type of computing device on which central database 602 is located, in order to obtain the requested configuration data from the source table. CDS instance 600 may then transmit the configuration data to computational instance 322, either all at once or in batches. For example, CDS instance 600 may transmit the configuration data in batches of five thousand (e.g., five thousand individual units of executable code, scripts, or other data). The configuration data can be transmitted in various forms, such as in one or more JavaScript Object Notation (JSON) arrays.

Upon receipt of the configuration data, computational instance 322 may write the configuration data to whichever destination field(s) in local database 606 are mapped to the source field(s) from which the configuration data was received. Referring to FIG. 6, for example, computational instance 322 may receive configuration data from Source Field 1. Computational instance 322 may refer to registry table 610 to determine that Source Field 1 is mapped to Destination Field 3. In response to this determination, computational instance 322 may write the configuration data from Source Field 1 to Destination Field 3.

Furthermore, if the received configuration data includes updates to previous versions of configuration data that is already stored in local database 606, computational instance 322 may update the previous versions with the newly-received configuration data, and if the configuration data includes new configuration data for which there are no previous versions in local database 606, computational instance 322 may create new fields in local database 606 that correspond to the new configuration data.

In some embodiments, in order to update registry table 610 with new fields, mappings, etc., such updates may be included as part of the configuration data stored at central database 602. Thus, when computational instance 322 receives configuration data including such updates, this may trigger registry table 610 to be updated.

Once the configuration data has been delivered and stored in local database 606, software module 608 may then be executed in accordance with that configuration data. In some embodiments, once the configuration has been delivered and stored, computational instance 322 may require, or give the option for, the enterprise (e.g., an individual with administrator privileges, or a certified application developer) to view and approve the configuration data before software module 608 can be executed. This may help the enterprise avoid processing any unwanted configuration data, such as configuration data that the enterprise may have obtained by mistake, or perhaps configuration data that the enterprise suspects could cause problems if processed.

In some embodiments, CDS instance 600 may enable an enterprise to opt-in for transmitting certain information to CDS instance 600, particularly information that may in turn enable the remote network management platform 320 to provide to the enterprise or other enterprises, in a subsequent out-of-band delivery, configuration data that the enterprise needs.

As an example, if the enterprise is lacking canonical normalization information for attributes of a particular software application installed on one or more client devices of managed network 300, CDS instance 600 may enable computational instance 322 to transmit such attributes to CDS instance 600. The remote network management platform 320 (e.g., an employee or other user associated with the entity that controls the remote network management platform) may then create or gather canonical normalization information corresponding for those attributes and include the canonical normalization information in an out-of-band delivery of configuration data to computational instance 322. Other examples are possible as well.

As another example, if one or more enterprises deploy a new software application, there may be no canonical normalization information for that software application. The enterprise(s) may indicate this to CDS instance 600, and then CDS instance 600 may be used to create the canonical normalization information for the software application. (This may also benefit all enterprises using the remote network management platform 320, since all enterprises may then have access to the canonical normalization information created for that software application.)

In these and other situations, the ability for the enterprise to opt-in for transmitting information to CDS instance 600 in this manner may be beneficial in that it notifies the remote network management platform 320 when the enterprise needs certain information and enables the remote network management platform 320 to efficiently provide the enterprise with the information the enterprise needs, thereby enabling the enterprise to better perform its operations. To more quickly provide the enterprise with needed information, the information may be included in out-of-band deliveries of configuration data. However, in some situations, the information could additionally or alternatively be included in in-band deliveries of configuration data.

To facilitate this, scoped application 604 may be further programmed with logic to receive such information from computational instance 322. Further, the remote network management platform 320 may provide a web-portal or software application through which the enterprise can select which information the enterprise will approve for transmission to CDS instance 600, such as a software application providing, for computational instance 322, a settings menu including the option to opt-in for transmission of select information. The selection can be made with varying granularity. For example, a selection can be made to approve transmission of all attributes of all software applications installed on client devices in managed network 300 for which computational instance 322 is unable to find corresponding canonical normalization information. As another example, the selection can be made to approve transmission of only a portion of attributes of all such software applications. As yet another example, the selection can be made to approve transmission of some or all attributes of only one or more software applications. Other examples are possible as well.

In response to a selection and approval of a particular type of information, computational instance 322 may be configured to gather and store, in registry table 610 or another location in local database 606, that type of information. Computational instance 322 may then transmit the information to CDS instance 600, which CDS instance 600 may then store in central database 602. In some embodiments, CDS instance 600 may include, in central database 602 or in a separate database, a "staging" table configured to store information received from computational instance 322. In some embodiments, computational instance 322 may have stored, at schedule table 612 or in another form, data indicative of how often (e.g., a time or frequency) to transmit the information to CDS instance 600. For example, computational instance 322 may transmit the information to CDS instance 600 on a weekly basis. In some embodiments, a web-portal or software application may enable the enterprise and/or the entity associated with the remote network management platform 320 to change how often the information is transmitted.

Figure 7:
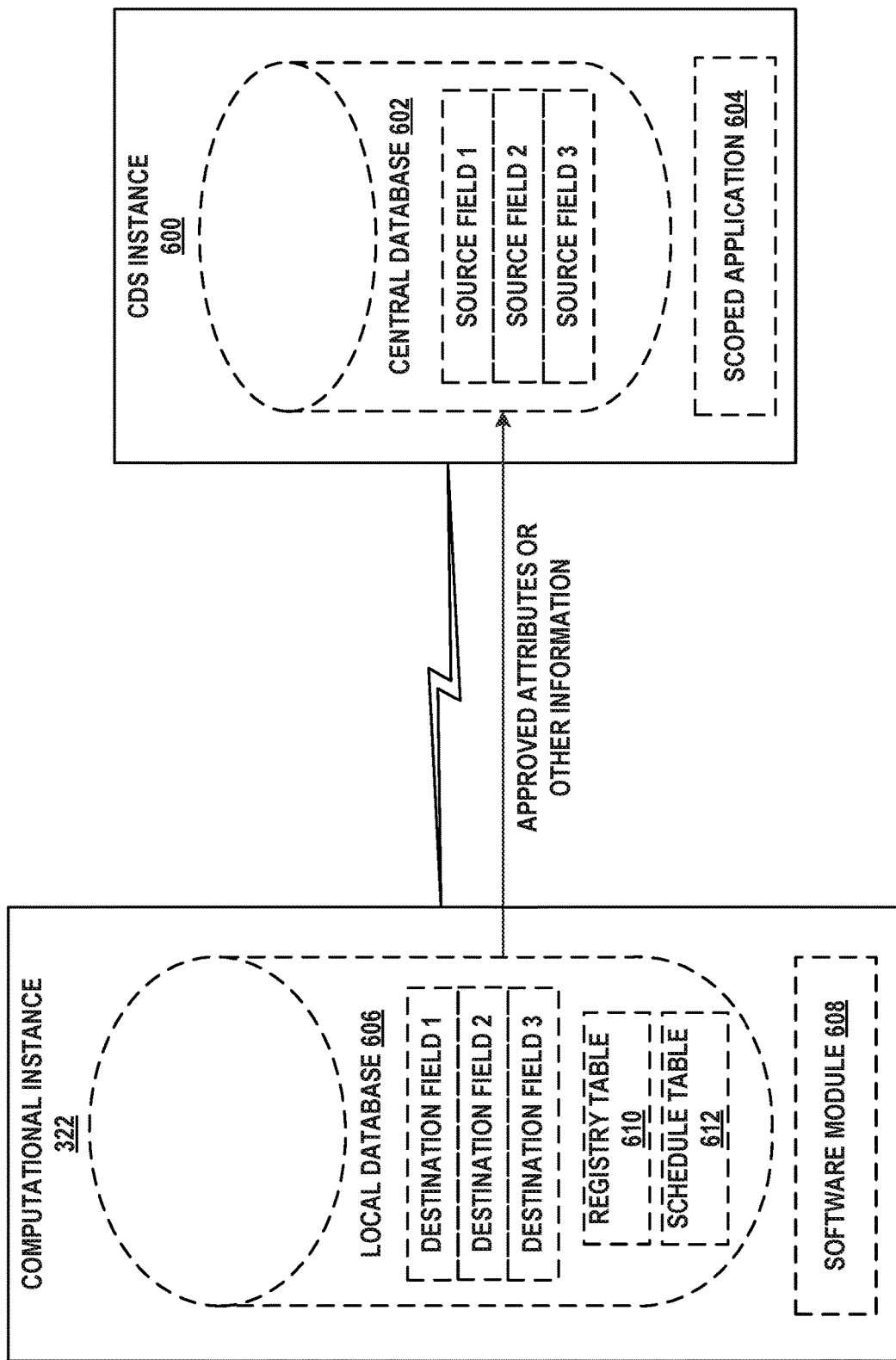
FIG. 7 depicts another communication environment involving the remote network management architecture of FIG. 6, in accordance with example embodiments.

An example of this process is shown in FIG. 7. FIG. 7 depicts another communication environment involving the remote network management architecture of FIG. 6, but with different communication occurring between computational instance 322 and CDS instance 600. As shown, computational instance 322 may transmit approved software application attributes from registry table 610 to CDS instance 600.

In some embodiments, once information is approved for transmission to CDS instance 600, computational instance 322 may be configured to transmit, and CDS instance 600 may be configured to receive, the information at various times. These times may be set by the enterprise or by another entity (e.g., by the entity controlling the remote network management platform 320). For example, the enterprise may select (e.g., via a web-portal or software application) to transmit approved information at a particular frequency (e.g., daily or weekly). Alternatively, in response to approval of certain information, computational instance 322 may be automatically configured to transmit the information at a particular frequency. Other examples are possible as well.

In some embodiments, the selected and approved information may be transmitted to CDS instance 600 anonymously—namely, without transmitting any information that identifies the enterprise and/or a user associated therewith, such as an identifier of computational instance 322 or a user account number.

In some embodiments, scoped application 604 may be further programmed to randomly reject information received from a computational instance. This may help provide anonymity for the enterprises associated with the information transmitted from their respective computational instances.

Various types of information can be transmitted to CDS instance 600 in the manner discussed above. As noted above, computational instance 322 may determine attributes of at least one software application installed on at least some client devices of managed network 300, and determine that the attributes are approved by the enterprise for transmission to CDS instance 600 (e.g., by receiving user input representing selection of the attributes). In response to determining that the attributes are approved by the enterprise, computational instance 322 may transmit the attributes to CDS instance 600. Such attributes may include any one or more of the attributes described above, such as a name of the at least one software application, a version of the at least one software application, and/or a vendor of the at least one software application.

As further noted above, the approved attributes may, in some situations, include attributes for which computational instance 322 is unable to find corresponding canonical normalization information. In these situations, computational instance 322 may transmit a discovery model that indicates, in the form of a JSON array, attributes for which no corresponding canonical normalization information was found. Computational instance 322 could transmit such attributes in other forms as well. In response to receiving such attributes, the remote network management platform 320 may include the corresponding canonical normalization information for the attributes in the source table so that the corresponding canonical normalization information can be included in a subsequent out-of-band delivery of configuration data to computational instance 322.

In some embodiments, computational instance 322 may be configured to report to CDS instance 600 statistics associated with the configuration data the enterprise has downloaded, such as which configuration data is in use by the enterprise and which configuration data has been downloaded, but not in use, among other possible statistics. For example, in such embodiments, computational instance 322 may transmit, in the discovery model or in another form, along with the attributes for which the enterprise does not have corresponding canonical normalization information, attributes for which the enterprise has corresponding canonical normalization information, so as to inform CDS instance 600 of which canonical normalization information is in use by the enterprise, or for other reasons.

As discussed above, the ability to maintain accurate identifying information about the enterprise's software applications and accurate information in the enterprise's software entitlement records may enable the enterprise to track to what degree software usage complies with software license rights held by managed network 300. As such, in some embodiments, the approved attributes may include license information for at least one software application installed on client devices of managed network 300. The license information may include at least a portion of the information described above, such as license metrics and license durations.

In some situations, when the enterprise is entering license information for a particular software application, the enterprise may encounter an error notifying the enterprise that a publisher part number has not been found for the software application. In particular, such an error may be indicated in response to computational instance 322 determining that a content library of the aPaaS system (e.g., a database specifying various publisher part numbers) does not contain a particular publisher part number inputted during an attempt by the enterprise to enter the license information for the software application. In such situations, computational instance 322 may store an indication that the particular publisher part number is needed for that software application, and the license information transmitted to CDS instance 600 may include an indication that a publisher part number is missing for the software application. Based on the license information included in the transmission for the software application (e.g., a name and/or version of the software application), or perhaps based on other information, the remote network management platform 320 may determine the publisher part number and include the publisher part number the source table so that the publisher part number can be included in a subsequent out-of-band delivery of configuration data to computational instance 322.

In some embodiments, the approved information transmitted to CDS instance 600 may include information related to security operations. For example, if managed network 300 encounters a security threat for which the enterprise does not have an associated workflow for preventing, computational instance 322 may store and then transmit, to CDS instance 600, information identifying the security threat. The enterprise may then later receive, in an out-of-band delivery of configuration data, a representation of the workflow for preventing the security threat. Other examples are possible as well.

In some embodiments, scoped application 604 (or another application or computing device) may be configured to determine whether particular information associated with computational instance 322 meets certain predefined criteria before scoped application 604 enables configuration data to be delivered out-of-band to computational instance 322 and/or before scoped application 604 enables approved information to be received from computational instance 322. To facilitate this, central database 602 may include information associated with computational instance 322, such as existing configuration data associated with computational instance 322. This information may take various forms. For example, this information may include a respective software release version of one or more software modules installed on computational instance 322. Additionally or alternatively, this information may include other attributes of computational instance 322, and/or perhaps attributes of client devices of managed network 300.

In an example embodiment, at some point in time before enabling computational instance 322 to receive at least a portion of the configuration data associated with software module 608 in accordance with a request for out-of-band delivery, CDS instance 600 may refer to central database 602 to determine which software release version of software module 608 computational instance 322 has installed. In response to the determination being that computational instance has installed the most-recent software release of software module 608, CDS instance 600 may enable computational instance 322 to receive at least a portion of the configuration data associated with software module 608. In this and other situations, the remote network management platform 320 can learn of how computational instance 322 and/or other applications, devices, etc. associated with an enterprise is configured before allowing the enterprise to receive certain configuration data. This may be particularly useful in scenarios where receipt and execution of certain configuration data could cause problems for the enterprise. For example, if computational instance 322 is running a software release version of software module 608 that is much older (e.g., two years old) than the current software release version of software module 608, receipt and execution of certain configuration data may cause users to experience errors when executing software module 608. Further, this may be useful in a scenario in which a schema of the destination table of computational instance 322 differs from the schema of the source table of CDS instance 600, which, if not corrected, could result in certain downloaded configuration data not being stored.

IX. Example Operations

Figure 8:
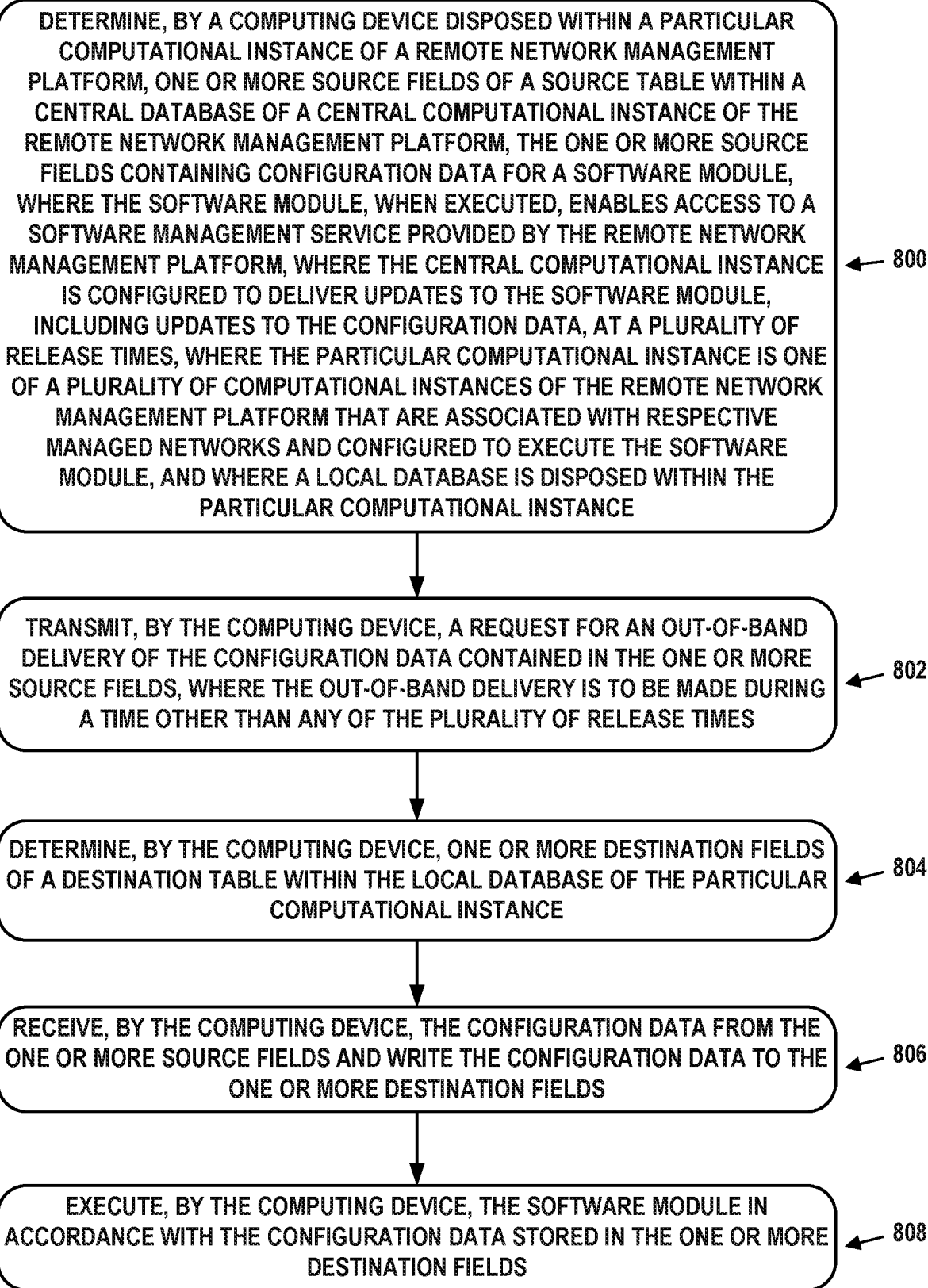
FIG. 8 is a flow chart, in accordance with example embodiments.

FIG. 8 depicts a flow chart illustrating an example embodiment. The process illustrated by FIG. 8 is described as carried out by a computing device (e.g., computing device 100) disposed within a computational instance of a remote network management platform (e.g., computational instance 322 of remote network management platform 320). Additionally or alternatively, this process could be carried out by another computing device, another a computational instance, or perhaps by a cluster of computing devices (e.g., server cluster 200). However, the process can be carried out by other types of devices or device subsystems. For example, the process could be carried out by a portable computer, such as a laptop or a tablet device.

The embodiment of FIG. 8 may be simplified by the removal of any one or more of the features shown therein. Further, this embodiment may be combined with features, aspects, and/or implementations of any of the previous figures or otherwise described herein.

In FIG. 8, block 800 involves determining, by a computing device disposed within a particular computational instance of a remote network management platform, one or more source fields of a source table within a central database of a central computational instance of the remote network management platform, the one or more source fields containing configuration data for a software module. The software module, when executed, may enable access to a software management service provided by the remote network management platform. The central computational instance may be configured to deliver updates to the software module, including updates to the configuration data, at a plurality of release times. The particular computational instance may be one of a plurality of computational instances of the remote network management platform that are associated with respective managed networks and configured to execute the software module. A local database may be disposed within the particular computational instance.

Block 802 involves transmitting, by the computing device, a request for an out-of-band delivery of the configuration data contained in the one or more source fields. The out-of-band delivery may be made during a time other than any of the plurality of release times.

Block 804 involves determining, by the computing device, one or more destination fields of a destination table within the local database of the particular computational instance.

Block 806 involves receiving, by the computing device, the configuration data from the one or more source fields and writing the configuration data to the one or more destination fields.

Block 808 involves executing, by the computing device, the software module in accordance with the configuration data stored in the one or more destination fields.

In some embodiments, the managed network associated with the particular computational instance is controlled by an entity. In such embodiments, the computing device may determine attributes of at least one software application installed on at least some client devices of the managed network, determine that the attributes are approved by the entity for transmission to the central computational instance, and in response to determining that the attributes are approved by the entity, transmit the attributes to the central computational instance.

In such embodiments, the computing device may be configured to identify software applications installed on client devices of the managed network using canonical normalization information that respectively corresponds to attributes of the software applications. The attributes of the at least one software application may comprise attributes for which the computing device is unable to find corresponding canonical normalization information. The attributes of the at least one software application may comprise one or more of: a name of the at least one software application, a version of the at least one software application, or a vendor of the at least one software application. In such embodiments, the out-of-band delivery of the configuration data may include the corresponding canonical normalization information for the attributes of the at least one software application.

In such embodiments, the attributes may comprise license information for the at least one software application. The license information may comprise one or more of: a name of the at least one software application, a version of the at least one software application, a publisher of the at least one software application, a license metric of the at least one software application, or a license duration of the at least one software application.

In such embodiments, the act of transmitting the attributes to the central computational instance may involve transmitting the attributes to the central computational instance without transmitting information identifying the entity.

In some embodiments, the central computational instance may be associated with a central network different from the managed networks.

In some embodiments, the act of transmitting the request for the out-of-band delivery of the configuration data may involve transmitting a request for the out-of-band delivery of the configuration data to occur at a frequency. In such embodiments, the acts of receiving and writing the configuration data may be performed at the frequency.

In some embodiments, the local database may contain a registry table identifying the one or more source fields of the source table and may define a mapping between the one or more source fields and corresponding destination fields of the destination table. In such embodiments, the act of determining the one or more destination fields of the destination table may involve referring to the registry table to determine the one or more destination fields of the destination table that are mapped to the one or more source fields.

In some embodiments, the central computational instance may be configured to refer to existing configuration data related to the particular computational instance and, in response to the existing configuration data related to the particular computational instance meeting predefined criteria, enable the computing device to receive the configuration data. In such embodiments, the existing configuration data related to the particular computational instance may be stored in the central database. In such embodiments, the act of referring to the existing configuration data related to the particular computational instance may involve referring to the central database to determine a software release version of the software module that the particular computational instance is executing. In such embodiments, the act of enabling the computing device to receive the configuration data in response to the existing configuration data related to the particular computational instance meeting the predefined criteria may involve enabling the computing device to receive the configuration data in response to the software release version of the software module being a most-recent software release version associated with the remote network management platform.

In some embodiments, a scoped application, customized by an entity associated with the remote network management platform, may be configured to run on the central computational instance and receive and process requests for the out-of-band delivery of the configuration data.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
processing circuitry; and
memory circuitry, accessible by the processing circuitry, the memory circuitry storing a first database and instructions that, when executed by the processing circuitry, cause the processing circuitry to execute a first computational instance configured to perform operations comprising:
determining one or more source fields of a source table within a second database accessible by a second computational instance, wherein the one or more source fields contain configuration data, and wherein the second computational instance is configured to deliver, from the one or more source fields and according to an update schedule, updates for a software module executing on the first computational instance;

transmitting a request for a delivery of the configuration data contained in the one or more source fields, wherein the delivery is to be made at a time that is outside of the update schedule;

receiving the configuration data from the second computational instance;

writing the configuration data to one or more destination fields of a destination table within the first database; and executing the software module in accordance with the configuration data stored in the one or more destination fields.

2. The system of claim 1, wherein the first computational instance is disposed within a first managed network operated by a first entity and wherein the second computational instance is disposed within a second managed network operated by a second entity.

3. The system of claim 1, wherein the first computational instance and the second computational instance are disposed within a managed network operated by a first entity.

4. The system of claim 1, wherein the update schedule corresponds a particular frequency of releases of configuration data in the second database over a period of time.

5. The system of claim 1, wherein the first computation instance is configured to transmit a second request for a second delivery of second configuration data.

6. The system of claim 1, wherein writing the configuration data to the one or more destination fields comprises:

updating one or more previous versions of the configuration data stored in the one or more destination fields.

7. The system of claim 1, wherein the operations comprise:

determining that the received configuration data comprises new configuration data for which no previous versions exists in the first database;

creating one or more additional destination fields in the destination table for the new configuration data; and writing the new configuration data to the one or more additional destination fields.

8. The system of claim 1, wherein the first database contains a registry table identifying the one or more source fields of the source table and defining a mapping between the one or more source fields and corresponding destination fields of the destination table, and wherein determining the one or more destination fields of the destination table comprises referring to the registry table to determine the one or more destination fields of the destination table that are mapped to the one or more source fields.

9. The system of claim 1, wherein the first computational instance is associated with a managed network managed by a remote management network platform, and wherein the operations comprise:

determining one or more attributes of at least one software application installed on at least one device within the managed network;

determining that the one or more attributes are approved by an entity that operates the managed network for transmission to the second computational instance; and in response to determining that the one or more attributes are approved by the entity, transmitting the one or more attributes to the second computational instance.

10. The system of claim 9, wherein the one or more attributes include canonical normalization information corresponding to the at least one software application.

11. The system of claim 9, wherein the delivery of the configuration data includes canonical normalization information for the one or more attributes of the at least one software application.

12. The system of claim 9, wherein the one or more attributes of the at least one software application comprise a name of the at least one software application, a version of the at least one software application, license information for the at least one software application, or a vendor of the at least one software application, or a combination thereof.

13. A method comprising:

determining, by a computing device associated with a first computational instance having access to a first database, one or more source fields of a source table within a second database accessible by a second computational instance, wherein the one or more source fields contain configuration data for a software module that, when executed, enables access to a service provided by a remote network management platform, wherein the second computational instance is configured to deliver updates to the configuration data of the software module according to an update schedule, and wherein the first computational instance is configured to execute the software module;

transmitting, by the computing device, a request for a delivery of the configuration data contained in the one or more source fields, wherein the delivery is configured to be made at a time that is outside of the update schedule;

receiving, by the computing device, the configuration data from the one or more source fields;

writing the configuration data to one or more destination fields of a destination table within the first database; and executing, by the computing device, the software module in accordance with the configuration data stored in the one or more destination fields.

14. The method of claim 13, wherein the first computational instance is disposed within a managed network managed by the remote management network platform, the method comprising:

determining, by the computing device, one or more attributes of at least one software application installed on at least one device within the managed network;

determining, by the computing device, that the one or more attributes are approved by an entity that operates the managed network for transmission to the second computational instance; and in response to determining that the one or more attributes are approved by the entity, transmitting, by the computing device, the one or more attributes to the second computational instance.

15. The method of claim 14, wherein the one or more attributes include canonical normalization information corresponding to the at least one software application.

16. A non-transitory, tangible, and computer-readable medium, storing instructions that, when executed by a processor associated with a first computational instance having access to a first database, cause the processor to perform operations comprising:

determining one or more source fields of a source table within a second database accessible by a second computational instance, wherein the one or more source fields contain configuration data for a software module, and wherein the second computational instance is configured to deliver, according to an update schedule, updates for the software module executing on the first computational instance;

transmitting a request for a delivery of the configuration data contained in the one or more source fields, wherein the delivery is to be made at a time that is outside of the update schedule;

receiving the configuration data from the second computational instance;

writing the configuration data to one or more destination fields of a destination table within the first database; and executing the software module in accordance with the configuration data stored in the one or more destination fields.

17. The non-transitory, tangible, and computer-readable medium of claim 16, wherein the first computational instance is disposed within a first managed network operated by a first entity and wherein the second computational instance is disposed within a second managed network operated by a second entity.

18. The non-transitory, tangible, and computer-readable medium of claim 16, wherein the first computational instance and the second computational instance are disposed within a managed network operated by a first entity.

19. The non-transitory, tangible, and computer-readable medium of claim 16, wherein writing the configuration data to the one or more destination fields comprises:

updating one or more previous versions of the configuration data stored in the one or more destination fields.

20. The non-transitory, tangible, and computer-readable medium of claim 16, wherein the operations comprise:

determining that the received configuration data comprises new configuration data for which no previous versions exists in the first database;

creating one or more additional destination fields in the destination table for the new configuration data; and writing the new configuration data to the one or more additional destination fields.

* * * * *